United States Patent
Liu et al.

(10) Patent No.: US 8,866,882 B2
(45) Date of Patent: Oct. 21, 2014

(54) STEREOSCOPIC IMAGE FORMAT TRANSFORMATION METHOD APPLIED TO DISPLAY SYSTEM

(75) Inventors: Yun-Cheng Liu, Taipei Shien (TW); Hsin-Hung Lee, Kaohsiung Shien (TW); Yu-Hsiang Huang, Taipei Shien (TW); Yao-Shun Tseng, Nantou Shien (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 2117 days.

(21) Appl. No.: 11/822,226

(22) Filed: Jul. 3, 2007

(65) Prior Publication Data
US 2008/0198218 A1    Aug. 21, 2008

(30) Foreign Application Priority Data
Nov. 3, 2006    (TW) ................................ 95140867 A (51) Int. Cl.
*H04N 13/00* (2006.01)
*H04N 7/01* (2006.01)

(52) U.S. Cl.
CPC ............ *H04N 13/0029* (2013.01); *H04N 7/012* (2013.01); *H04N 7/0122* (2013.01)
USPC ........................................................ 348/43

(58) Field of Classification Search
USPC .................................................. 348/42–43
See application file for complete search history.

(56) References Cited

U.S. PATENT DOCUMENTS

| | | | |
|---|---|---|---|
| 6,088,052 A | 7/2000 | Guralnick | |
| 6,947,097 B1 * | 9/2005 | Joanblanq | 348/558 |
| 2002/0011969 A1 | 1/2002 | Lipton et al. | |
| 2002/0163574 A1 | 11/2002 | Divelbiss | |
| 2004/0218269 A1 * | 11/2004 | Divelbiss et al. | 359/464 |
| 2006/0125916 A1 | 6/2006 | Mashitani | |
| 2006/0204239 A1 | 9/2006 | Inaba | |

FOREIGN PATENT DOCUMENTS

| | | |
|---|---|---|
| JP | 2001-036871 | 2/2001 |
| JP | 2003-289553 | 10/2003 |

OTHER PUBLICATIONS

English language translation of abstract of JP 2001-036871 (published Feb. 9, 2001).
English language translation of abstract of JP 2003-289553 (published Oct. 10, 2003).
Chinese language Taiwan Office Action dated Sep. 5, 2011.

* cited by examiner

*Primary Examiner* — John Macilwinen
(74) *Attorney, Agent, or Firm* — McClure, Qualey & Rodack, LLP (57) ABSTRACT

In a display system, the invention provides a stereoscopic image format transformation method being used for transforming a non-interlace format of a stereoscopic image into an interlace format. When an aspect ratio of the stereoscopic image is not equal to an aspect ratio of a panel, the stereoscopic image format transformation method of the invention is used for interlacing a left-eye image data and a right-eye image data of the stereoscopic image according to a format of the stereoscopic image, the aspect ratio of the panel, and the aspect ratio of the stereoscopic image, to form a completely interlaced stereoscopic image.

4 Claims, 9 Drawing Sheets

STEREOSCOPIC IMAGE FORMAT TRANSFORMATION METHOD APPLIED TO DISPLAY SYSTEM

BACKGROUND OF THE INVENTION

1. Field of the Invention

This invention relates to a stereoscopic image transformation method and, more particularly, relates to a method for transforming a non-interlace format of a stereoscopic image into an interlace format.

2. Description of the Prior Art

In general, a 3D stereoscopic image is formed by combining two sets of image data in different visual angles, wherein one set of image data corresponds to left-eye visual angle, and the other set of image data corresponds to right-eye visual angle. When a 3D stereoscopic image is displayed, the left eye of a viewer merely sees the image data corresponding to left-eye visual angle, and the right eye of the viewer merely sees the image data corresponding to right-eye visual angle. Accordingly, a stereoscopic vision is generated in the brain of the viewer.

Figure 1A:
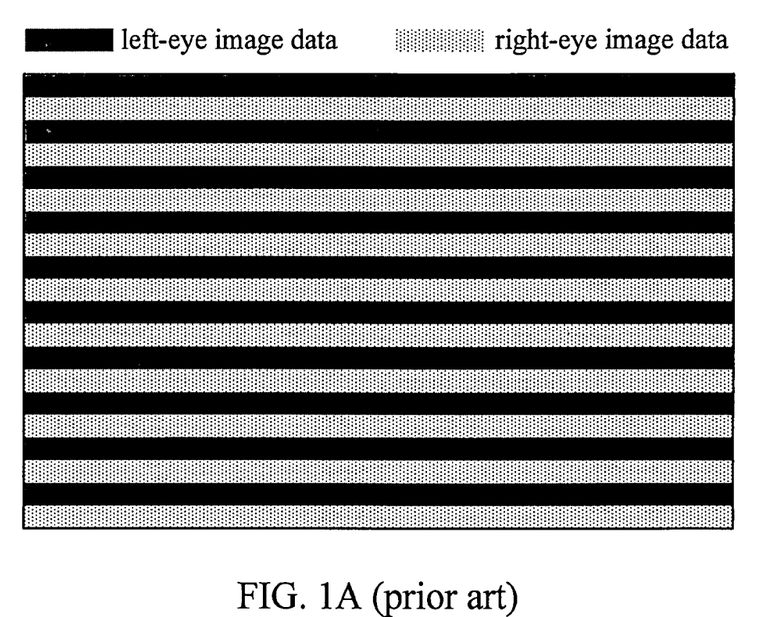
FIG. 1A is a schematic diagram illustrating an anaglyph stereoscopic image.
Figure 1B:
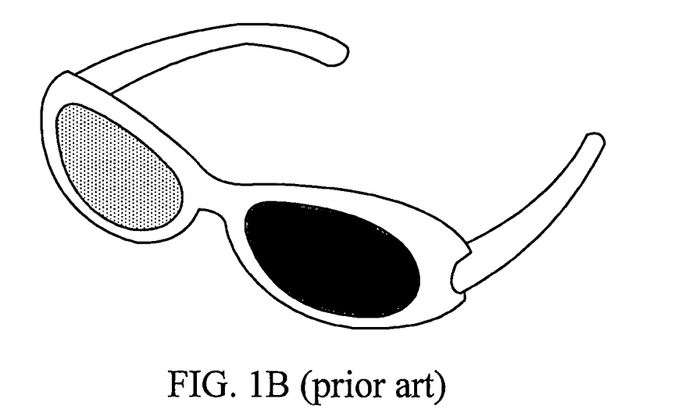
FIG. 1B is an external view illustrating a pair of glasses for seeing an anaglyph stereoscopic image.

Referring to FIG. 1A and FIG. 1B, FIG. 1A is a schematic diagram illustrating an anaglyph stereoscopic image. FIG. 1B is an external view illustrating a pair of glasses for seeing an anaglyph stereoscopic image. So far, several methods for dividing image data into left-eye and right-eye image data have been disclosed. For example, the anaglyph theory is applied to the stereoscopic image. In the beginning, a normal image is divided into the left-eye and the right-eye image data. Afterward, red or blue color in the left-eye or right-eye image data is respectively filtered off. Finally, as shown in FIG. 1A, a stereoscopic image is formed by interlacing those two image data being processed before. As shown in FIG. 1B, a viewer needs to wear a pair of glasses with one red and one blue eyeglass, so as to enable his left eye and right eye to see respective color image. Consequently, the viewer will see a stereoscopic image.

Another technique utilizes a polarizer to generate two different polarizations, such that an image can be divided into left-eye and right-eye image data. For example, the polarizers can be attached onto each lens of two projectors respectively, such that the light emitted from one projector differs from the other one by 90 degrees. Then, by using a screen capable of keeping the polarization of light, the viewer can wear a pair of glasses having eyeglasses with two different polarizations to see a stereoscopic image.

Along with the progress in fabrication technique, a polarized film with the same line width as liquid crystal display (LCD) has been manufactured. Through the polarized film, the polarization of odd lines is perpendicular to that of even lines. When a viewer wears a pair of glasses with appropriate polarization, he/she will see a stereoscopic image.

However, if an aspect ratio of a panel does not comply with that of a stereoscopic image, the format of the image will be transformed into a wrong format, and a stereoscopic image can not be formed.

Figure 2A:
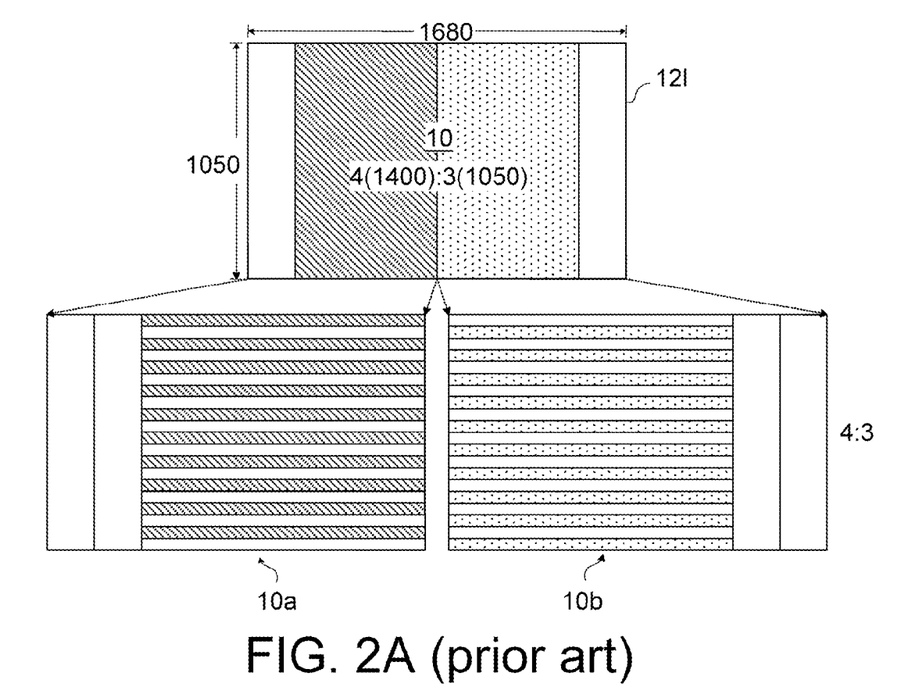
FIG. 2A is a schematic diagram illustrating a stereoscopic image with a side-by-side format being transformed into an interlace format.

Referring to FIG. 2A, FIG. 2A is a schematic diagram illustrating a stereoscopic image 10 with a side-by-side format being transformed into an interlace format. As shown in FIG. 2A, the panel 12 is an interlaced panel, the aspect ratio of the panel 12 is 16:10 (the resolution is 1680*1050), and the aspect ratio of the stereoscopic image 10 is 4:3. When the format of the stereoscopic image 10 is being transformed into another, the left part of the image 10 on the panel 12 will be extended to a width of 1680 and be transformed into odd scanning lines as image 10a shown in FIG. 2A. The right part of image 10 on the panel 12 will also be extended to a width of 1680 and be transformed into even scanning lines as image 10b shown in FIG. 2A. Finally, the odd and even scanning lines can be interlaced to form a stereoscopic image.

Figure 2B:
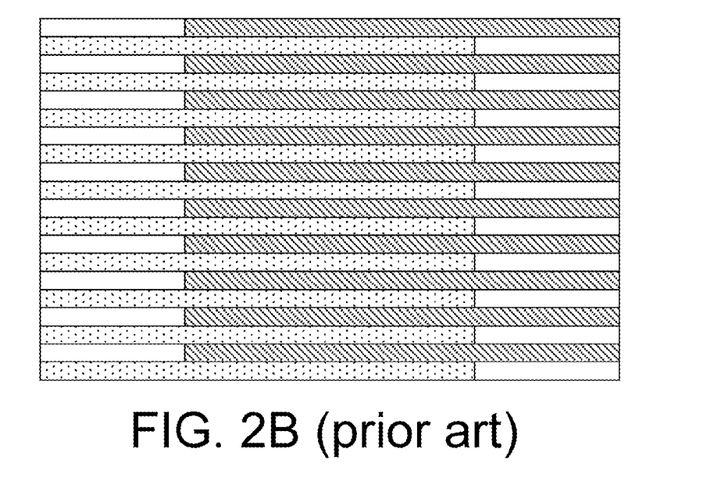
FIG. 2B is a schematic diagram illustrating an interlace format of the stereoscopic image.

Referring to FIG. 2B, FIG. 2B is a schematic diagram illustrating an interlace format of the stereoscopic image 10. Obviously, a completely stereoscopic image can not be formed by interlacing the left-eye and right-eye image data, because it will make the viewer uncomfortable.

Figure 3A:
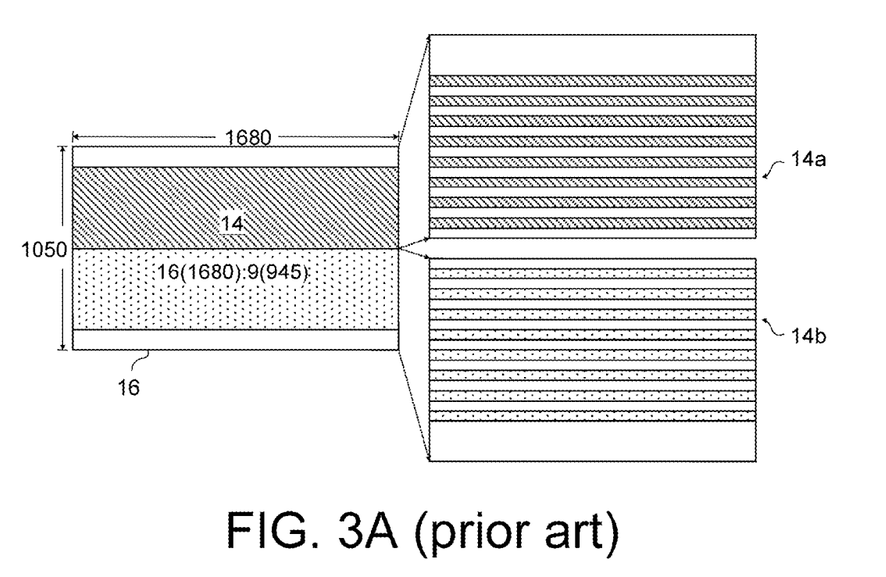
FIG. 3A is a schematic diagram illustrating a stereoscopic image with an above-and-below format being transformed into an interlace format.

Referring to FIG. 3A, FIG. 3A is a schematic diagram illustrating a stereoscopic image 14 with an above-and-below format being transformed into an interlace format. As shown in FIG. 3A, the panel 16 is an interlaced panel, the aspect ratio of the panel 16 is 16:10 (the resolution is 1680*1050), and the aspect ratio of the stereoscopic image 14 is 16:9. When the format of the stereoscopic image 14 is being transformed into another, the upper part of the image 14 on the panel 16 will be extended to a height of 1050 and be transformed into odd scanning lines as image 14a shown in FIG. 3A. The lower part of the image 14 on the panel 16 will also be extended to a height of 1050 and be transformed into even scanning lines as image 14b shown in FIG. 3A. Finally, the odd and even scanning lines can be interlaced to form a stereoscopic image.

Figure 3B:
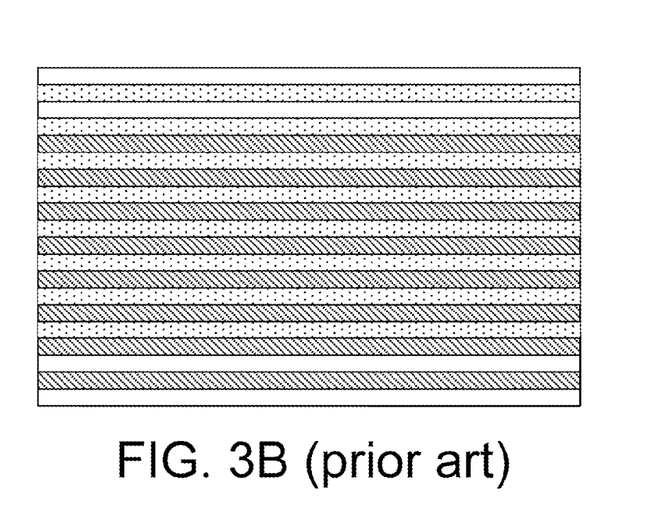
FIG. 3B is a schematic diagram illustrating an interlace format of the stereoscopic image.

Referring to FIG. 3B, FIG. 3B is a schematic diagram illustrating an interlace format of the stereoscopic image 14. Obviously, a completely stereoscopic image can not be formed by interlacing the left-eye and right-eye image data, because it will make the viewer uncomfortable.

Therefore, in a display system, the main scope of the invention is to provide a method for transforming a non-interlace format of the stereoscopic image into an interlace format, so as to solve the aforesaid problems.

SUMMARY OF THE INVENTION

A scope of the invention is to provide a method for transforming a format of a stereoscopic image by interlacing a left-eye image data and a right-eye image data of the stereoscopic image according to the format of the stereoscopic image, a first aspect ratio of the panel, and a second aspect ratio of the stereoscopic image, so as to form a completely interlaced stereoscopic image.

According to a preferred embodiment, in a display system, the method of the invention is used for transforming a non-interlace format of a stereoscopic image into an interlace format. A panel of the display system has a first aspect ratio, and the stereoscopic image with a second aspect ratio comprises a left-eye image data and a right-eye image data. The method of the invention comprises the following steps.

In the beginning, the stereoscopic image is received. Afterward, whether the second aspect ratio of the stereoscopic image is equal to the first aspect ratio of the panel is judged, and if it is YES, the non-interlace format of the stereoscopic image is transformed into the interlace format in a general manner; otherwise, the left-eye image data and the right-eye image data of the stereoscopic image are interlaced according to the non-interlace format of the stereoscopic image, the first aspect ratio of the panel, and the second aspect ratio of the stereoscopic image, so as to form a completely interlaced stereoscopic image.

Accordingly, even if the aspect ratio of the stereoscopic image is not equal to the aspect ratio of the panel, the method of the invention transforms the non-interlace format of the stereoscopic image into the interlace format according to the format of the stereoscopic image, the aspect ratio of the panel, and the aspect ratio of the stereoscopic image. In other words, the invention can correct an image without affecting the aspect ratio of the image, so as to form a completely interlaced stereoscopic image.

The advantages and spirits of the invention may be understood by the following recitations together with the appended drawings.

DETAILED DESCRIPTION OF THE INVENTION

Figure 4:
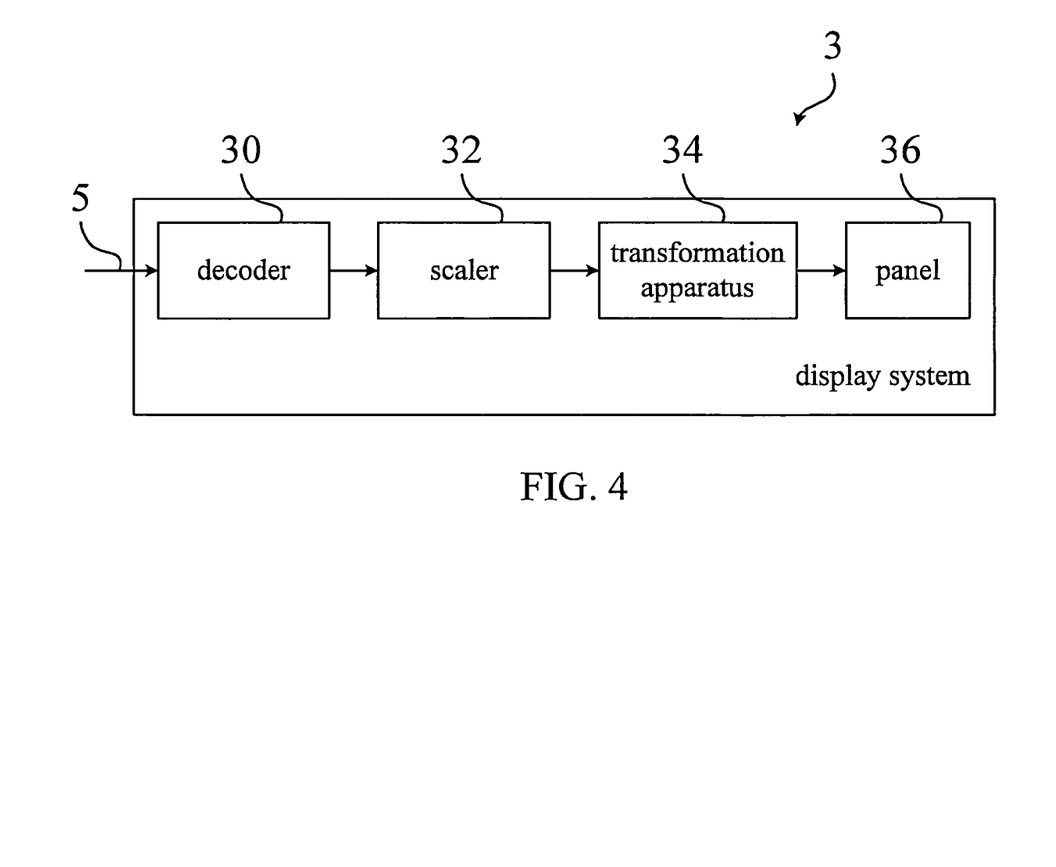
FIG. 4 is a functional block diagram illustrating a display system according to a preferred embodiment of the invention.

Referring to FIG. 4, FIG. 4 is a functional block diagram illustrating a display system 3 according to a preferred embodiment of the invention. The display system 3 comprises a decoder 30, a scaler 32, a transformation apparatus 34, and a panel 36 with a first aspect ratio.

In this embodiment, the decoder 30 is used for receiving and decoding a stereoscopic image 5. The stereoscopic image 5 with a non-interlace format and a second aspect ratio comprises a left-eye image data and a right image data. The scaler 32 is used for scaling the stereoscopic image 5 to comply with the native resolution of the panel 36. The transformation apparatus 34 is used for transforming the non-interlace format of the stereoscopic image 5 into an interlace format.

In this embodiment, the interlace format of the stereoscopic image 5 can be a side-by-side format or an above-and-below format. Some examples will be taken to explain how the invention transforms the side-by-side format or the above-and-below format into the interlace format.

Stereoscopic Image With a Side-by-side Format

Figure 5A:
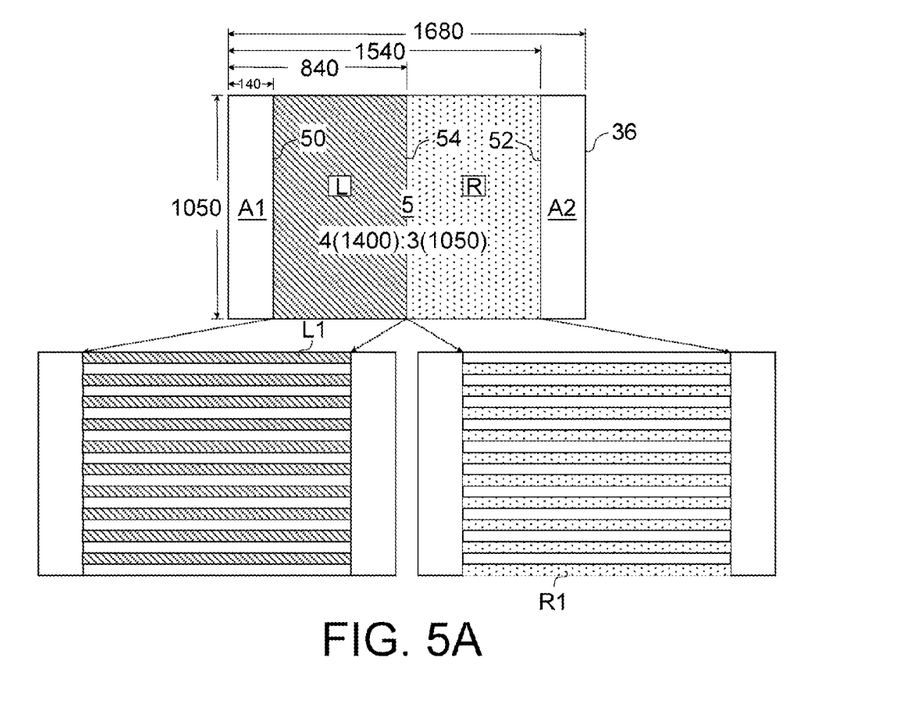
FIG. 5A is a schematic diagram illustrating the stereoscopic image with a side-by-side format being transformed into an interlace format.

Referring to FIG. 5A, FIG. 5A is a schematic diagram illustrating the stereoscopic image 5 with a side-by-side format being transformed into an interlace format. As shown in FIG. 5A, the panel 36 is an interlaced panel, the aspect ratio of the panel is, but not limited to, 16:10 (the resolution is 1680*1050), and the aspect ratio of the stereoscopic image 5 is, but not limited to, 4:3.

Figure 5B:
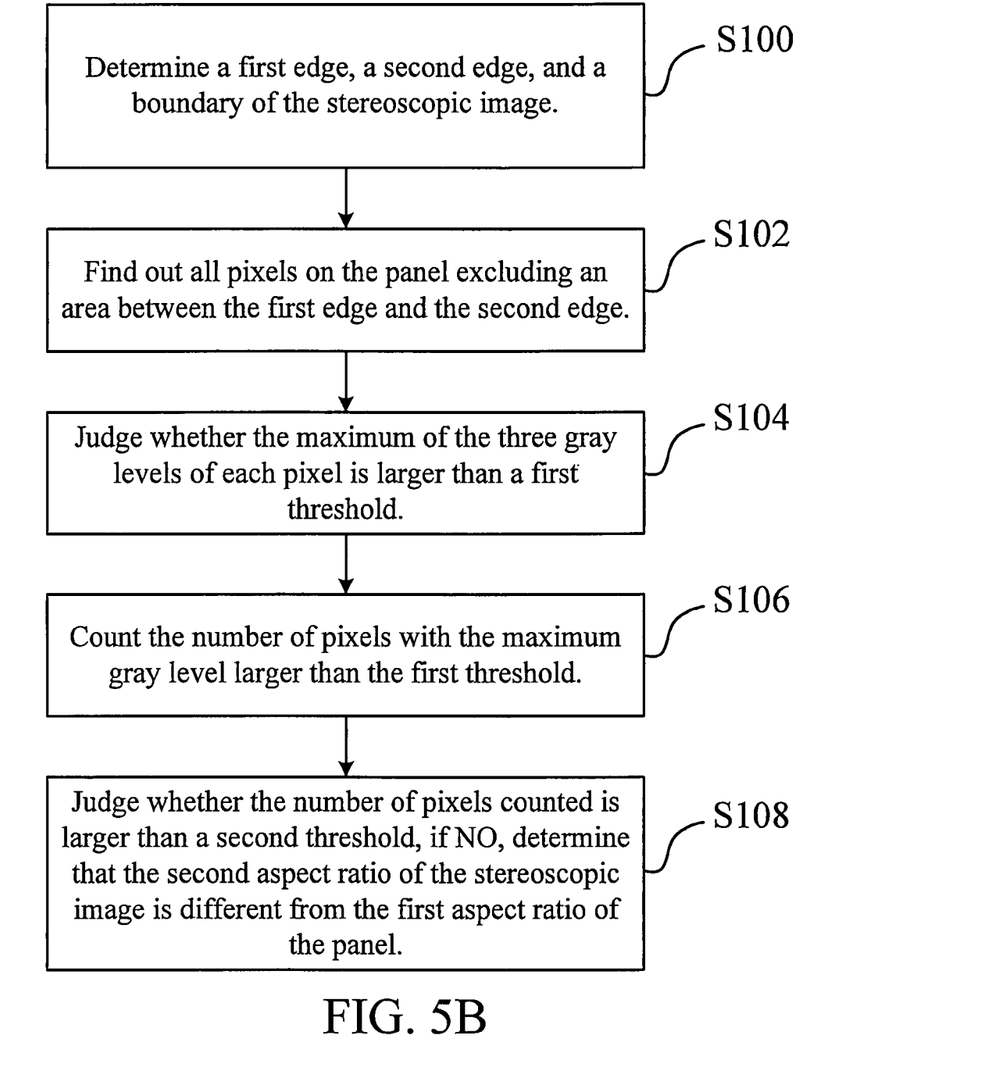
FIG. 5B is a flow chart judging whether the aspect ratio of the stereoscopic image is equal to the aspect ratio of the panel according to the invention.

Referring to FIG. 5B, FIG. 5B is a flow chart judging whether the aspect ratio of the stereoscopic image 5 is equal to the aspect ratio of the panel 36 according to the invention. First, the method of the invention will judge whether the aspect ratio of the stereoscopic image 5 is equal to the aspect ratio of the panel 36.

In the beginning, step S100 is performed to determine a first edge 50, a second edge 52, and a boundary 54 of the stereoscopic image 5 according to the aspect ratio (16:10) of the panel 36 and the aspect ratio (4:3) of the stereoscopic image 5.

Afterward, step S102 is performed to find out all pixels on the panel 36 excluding an area between the first edge 50 and the second edge 52 (i.e. all pixels in the areas A1 and A2 are shown in FIG. 5A), wherein each pixel comprises N color components and N gray levels, each gray level corresponds to one of the N color components, and N is a natural number. In this embodiment, each pixel comprises three color components, i.e. RGB.

Step S104 is then performed to judge whether the maximum of the three gray levels of each pixel in areas A1 and A2 (as shown in FIG. 5A) is larger than a first threshold, wherein the first threshold can be set based on practical applications. For example, the first threshold can be set as a gray level equal to 15.

Step S106 is then performed to count the number of pixels with the maximum gray level larger than the first threshold.

Finally, step S108 is performed to judge whether the number of pixels counted in the step S106 is larger than a second threshold. If the number is smaller than the second threshold, the aspect ratio of the stereoscopic image 5 is not equal to the aspect ratio of the panel 36. It should be noted that the second threshold can be set based on practical applications. For example, the second threshold can be set as 15.

Figure 5C:
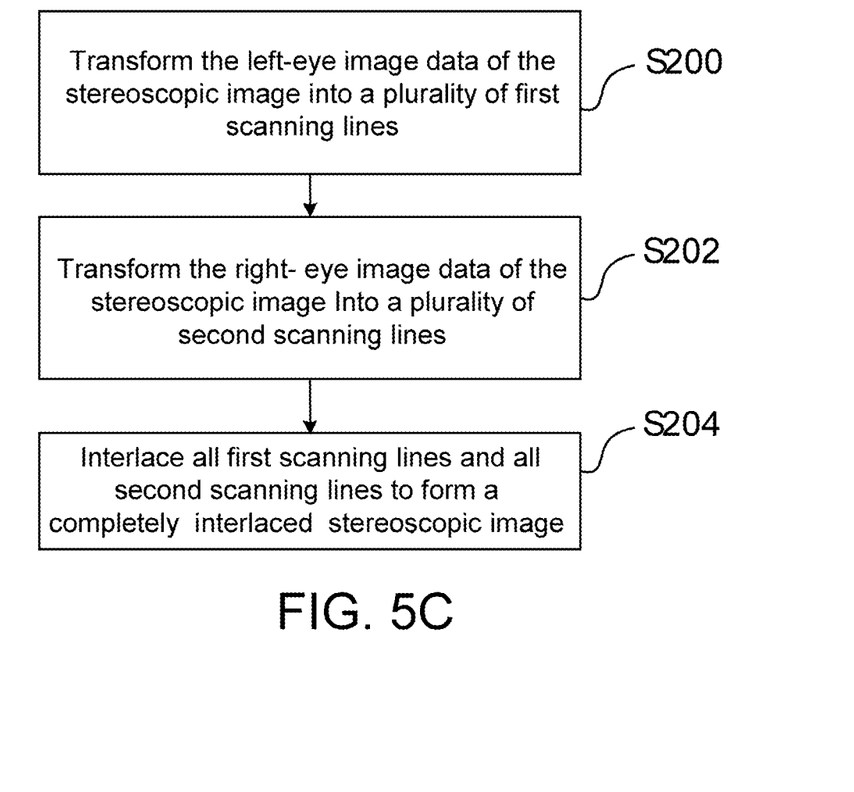
FIG. 5C is a flow chart showing a side-by-side format of the stereoscopic image being transformed into an interlace format according to the invention.
Figure 5D:
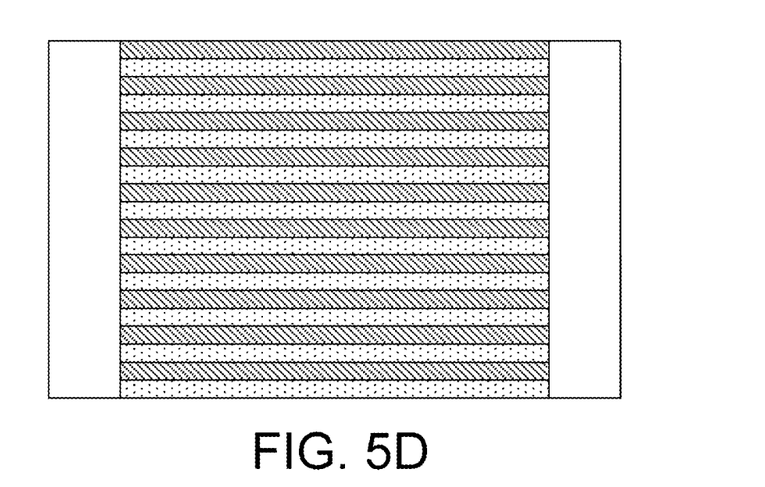
FIG. 5D is a schematic diagram illustrating a completely interlaced stereoscopic image being formed by the method of the invention.

Referring to FIG. 5C and FIG. 5D, FIG. 5C is a flow chart showing a side-by-side format of the stereoscopic image 5 being transformed into an interlace format according to the invention. FIG. 5D is a schematic diagram illustrating a completely interlaced stereoscopic image being formed by the method of the invention. In this embodiment, because the aspect ratio (4:3) of the stereoscopic image 5 is not equal to the aspect ratio (16:10) of the panel 36, the method of the invention will transform the side-by-side format of the stereoscopic image 5 into the interlace format according to the format (side-by-side) of the stereoscopic image 5, the aspect ratio (16:10) of the panel 36, and the aspect ratio (4:3) of the stereoscopic image 5.

In the beginning, step S200 is performed to transform the left-eye image data (i.e. the area L shown in FIG. 5A) of the stereoscopic image 5 into a plurality of first scanning lines L1 according to the side-by-side format, the first edge 50, and the boundary 54 of the stereoscopic image 5.

Afterward, step S202 is performed to transform the right-eye image data (i.e. the area R shown in FIG. 5A) of the stereoscopic image 5 into a plurality of second scanning lines R1 according to the side-by-side format, the second edge 52, and the boundary 54 of the stereoscopic image 5.

Finally, step S204 is performed to interlace all first scanning lines L1 and all second scanning lines R1 to form a completely interlaced stereoscopic image, as shown in FIG. 5D.

It should be noted that with the invention, step S202 can be performed first, followed by step S200.

Stereoscopic Image With an Above-and-below Format

Figure 6A:
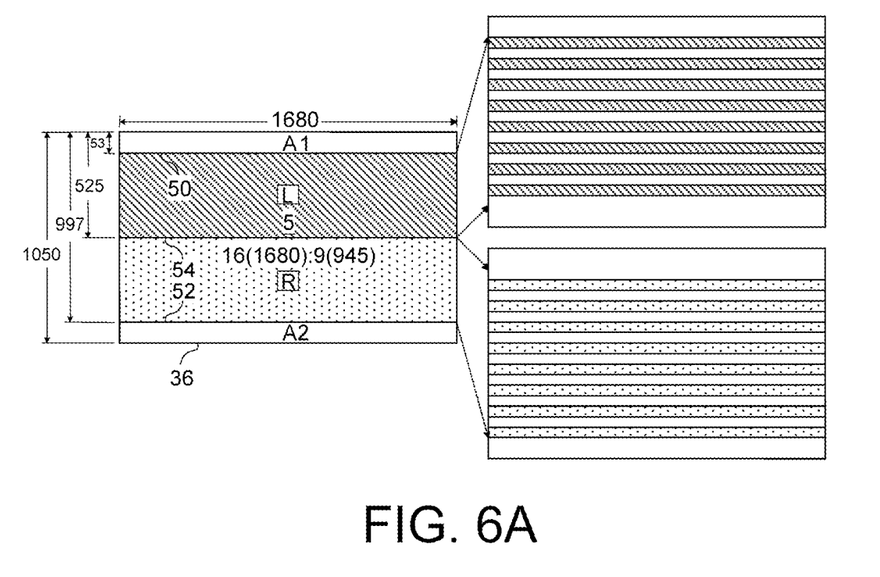
FIG. 6A is a schematic diagram illustrating the stereoscopic image with an above-and-below format being transformed into an interlace format.

Referring to FIG. 6A, FIG. 6A is a schematic diagram illustrating the stereoscopic image 5 with an above-and-below format being transformed into an interlace format. As shown in FIG. 6A, the panel 36 is an interlaced panel, the aspect ratio of the panel is, but not limited to, 16:10 (the resolution is 1680*1050), and the aspect ratio of the stereoscopic image 5 is, but not limit to, 16:9.

First, the method of the invention will judge whether the aspect ratio of the stereoscopic image 5 is equal to the aspect ratio of the panel 36.

In the beginning, a first edge 50, a second edge 52, and a boundary 54 of the stereoscopic image 5 are determined according to the aspect ratio (16:10) of the panel 36 and the aspect ratio (16:9) of the stereoscopic image 5.

Afterward, all pixels on the panel 36 are found out excluding an area between the first edge 50 and the second edge 52 (i.e. all pixels in the areas A1 and A2 shown in FIG. 6A).

Then, whether the maximum of the three gray levels (RGB) of each pixel in the areas A1 and A2 (as shown in FIG. 6A) is larger than a first threshold is judged, wherein the first threshold ca be set based on practical applications. For example, the first threshold can be set as gray level equal to 15.

Then, the number of pixels with the maximum gray level larger than the first threshold is counted.

Finally, whether the number of pixels counted is larger than a second threshold is judged. If the number is smaller than the second threshold, the aspect ratio of the stereoscopic image 5 is not equal to the aspect ratio of the panel 36. It should be noted that the second threshold can be set based on practical applications. For example, the second threshold can be set as 15.

Figure 6B:
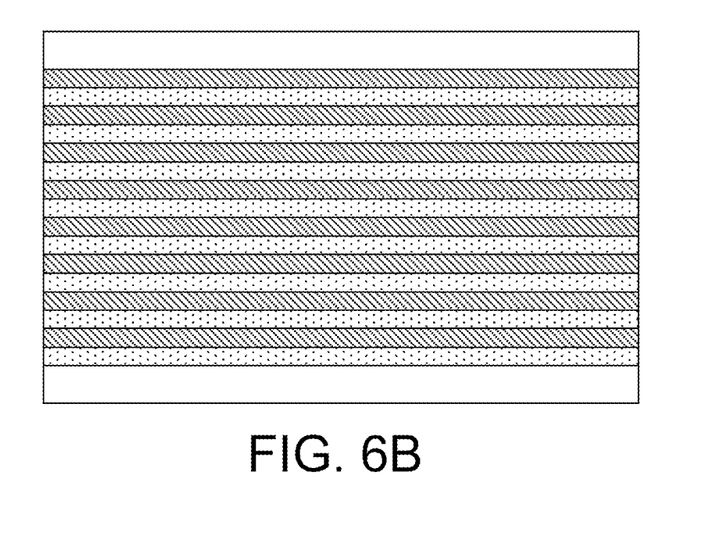
FIG. 6B is a schematic diagram illustrating a completely interlaced stereoscopic image being formed by the method of the invention.

FIG. 6B is a schematic diagram illustrating a completely interlaced stereoscopic image being formed by the method of the invention. In this embodiment, because the aspect ratio (16:9) of the stereoscopic image 5 is not equal to the aspect ratio (16:10) of the panel 36, the method of the invention will transform the above-and-below format of the stereoscopic image 5 into the interlace format according to the format (above-and-below) of the stereoscopic image 5, the aspect ratio (16:10) of the panel, and the aspect ratio (16:9) of the stereoscopic image 5.

In the beginning, the left-eye image data (i.e. the area L shown in FIG. 6A) of the stereoscopic image 5 is transformed into a plurality of first scanning lines L1 according to the above-and-below format, the first edge 50, and the boundary 54 of the stereoscopic image 5.

Afterward, the right-eye image data (i.e. the area R shown in FIG. 6A) of the stereoscopic image 5 is transformed into a plurality of second scanning lines R1 according to the above-and-below format, the second edge 52, and the boundary 54 of the stereoscopic image 5.

Finally, all first scanning lines L1 and all second scanning lines R1 are interlaced to form a completely interlaced stereoscopic image, as shown in FIG. 6B.

Figure 7:
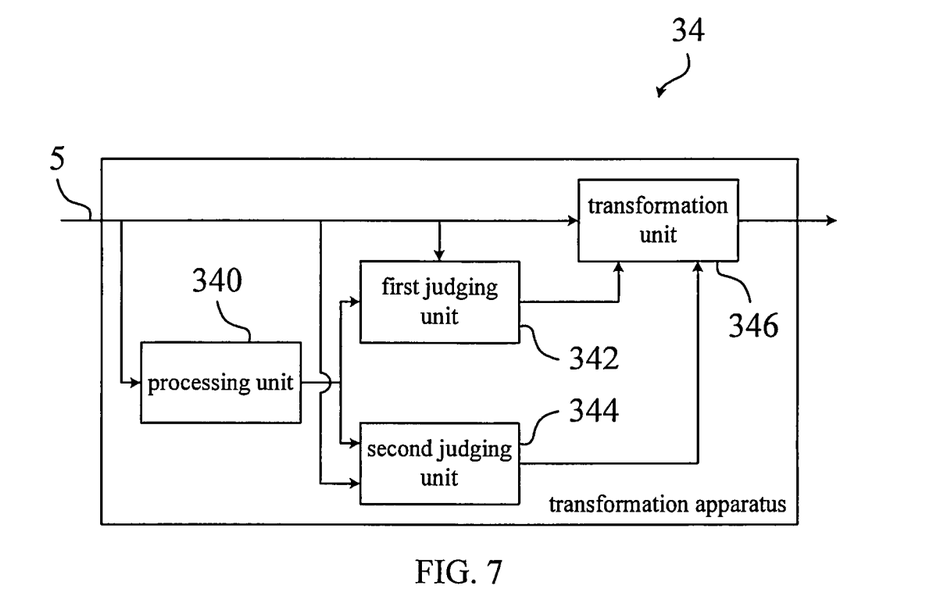
FIG. 7 is a functional block diagram illustrating a transformation apparatus according to a preferred embodiment of the invention.

Referring to FIG. 7, FIG. 7 is a functional block diagram illustrating a transformation apparatus 34 according to a preferred embodiment of the invention. The transformation apparatus 34 comprises a processing unit 340, a first judging unit 342, a second judging unit 344, and a transformation unit 346. The processing unit 340 transmits the stereoscopic image 5 with a side-by-side format to the first judging unit 342, or transmits the stereoscopic image 5 with an above-and-below format to the second judging unit 344. The first judging unit 342 judges whether the aspect ratio of the stereoscopic image 5 with the side-by-side format is equal to the aspect ratio of the panel 36. The second judging unit 344 judges whether the aspect ratio of the stereoscopic image 5 with the above-and-below format is equal to the aspect ratio of the panel 36. The transformation unit 346 interlaces the left-eye image data and the right-eye image data of the stereoscopic image 5 to form a completely interlaced stereoscopic image according to the format (side-by-side or above-and-below) of the stereoscopic image 5, the aspect ratio of the panel 36, and the aspect ratio of the stereoscopic image 5. Accordingly, when the stereoscopic image is played repeatedly, a wrong image will not be formed when the aspect ratio (the resolution) of the panel is not equal to the stereoscopic image.

Compared to the prior art, even if the aspect ratio of the stereoscopic image is not equal to the aspect ratio of the panel, the method of the invention can be used for transforming a non-interlace format of the stereoscopic image to an interlace format according to the format of the stereoscopic image, the aspect ratio of the panel, and the aspect ratio of the stereoscopic image. In other words, the method of the invention can be used to correct an image without affecting the aspect ratio, and a completely interlaced stereoscopic image is formed.

With the example and explanations above, the features and spirits of the invention are hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. In a display system, a stereoscopic image format transformation method being used for transforming a non-interlace format of a stereoscopic image into an interlace format, the display system comprising a panel with a first aspect ratio, the stereoscopic image with a second aspect ratio comprising a left-eye image data and a right-eye image data, the method comprising steps of:
   (a) receiving the stereoscopic image;
   (b) determining a first edge of the stereoscopic image, a second edge of the stereoscopic image and a boundary between the left-eye image data and the right-eye image data of the stereoscopic image according to the first aspect ratio of the panel and the second aspect ratio of the stereoscopic image and judging whether the second aspect ratio of the stereoscopic image is equal to the first aspect ratio of the panel according to the first edge, the second edge and the boundary, if NO, performing step (c); and
   (c) interlacing the left-eye image data and the right-eye image data of the stereoscopic image according to the first edge, the second edge, the boundary, non-interlace format, the first aspect ratio of the panel, and the second aspect ratio of the stereoscopic image.

2. The method of claim 1, wherein step (b) further comprises steps of:
   (b1) finding out all pixels on the panel excluding an area between the first edge and the second edge, wherein each pixel comprises N color components, and N gray levels, and each gray level corresponds to one of the N color components, N is a natural number;
   (b2) judging whether the maximum of N gray levels of each pixel in step (b1) is larger than a first threshold;

(b3) counting the number of pixels with the maximum gray level larger than the first threshold; and (b4) judging whether the number of pixels counted in step (b3) is larger than a second threshold, if NO, determining that the second aspect ratio of the stereoscopic image is different from the first aspect ratio of the panel.

3. The method of claim 2, wherein step (c) further comprises steps of:

(c1) transforming the left-eye image data of the stereoscopic image into a plurality of first scanning lines according to the non-interlace format, the first edge, and the boundary of the stereoscopic image;

(c2) transforming the right-eye image data of the stereoscopic image into a plurality of second scanning lines according to the non-interlace format, the second edge, and the boundary of the stereoscopic image; and (c3) interlacing the first scanning lines and the second scanning lines.

4. The method of claim 1, wherein the non-interlace format is a side-by-side format or an above-and-below format.

* * * * *